Oct. 7, 1930.                J. L. LAWRENCE                    1,777,852
                              MOTOR DRIVEN PUMP
                            Filed Nov. 12, 1923           2 Sheets-Sheet 1
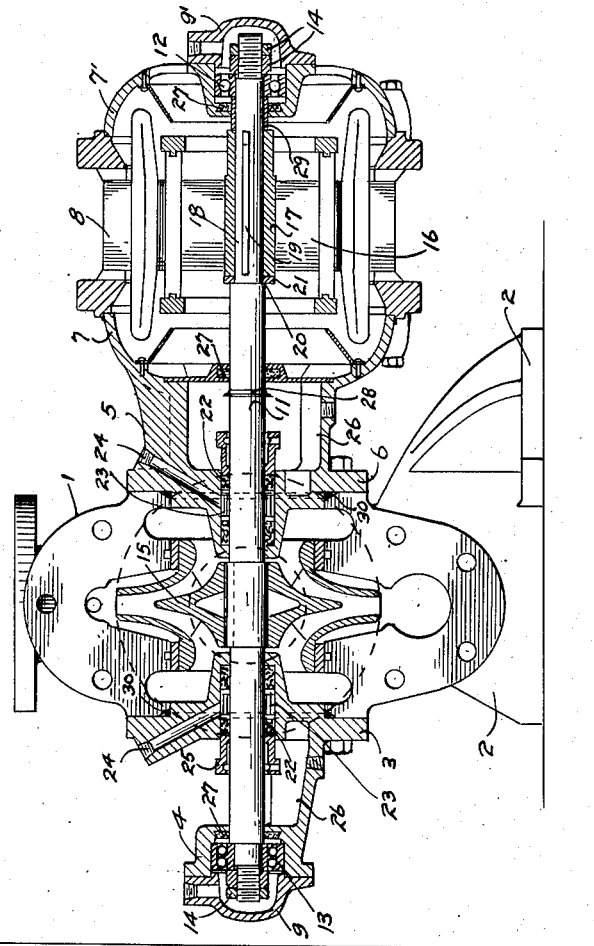
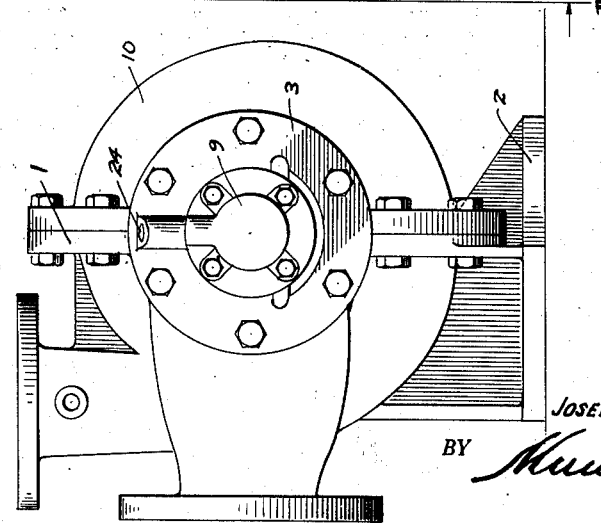
INVENTOR.
JOSEPH L. LAWRENCE
BY
       ATTORNEYS.

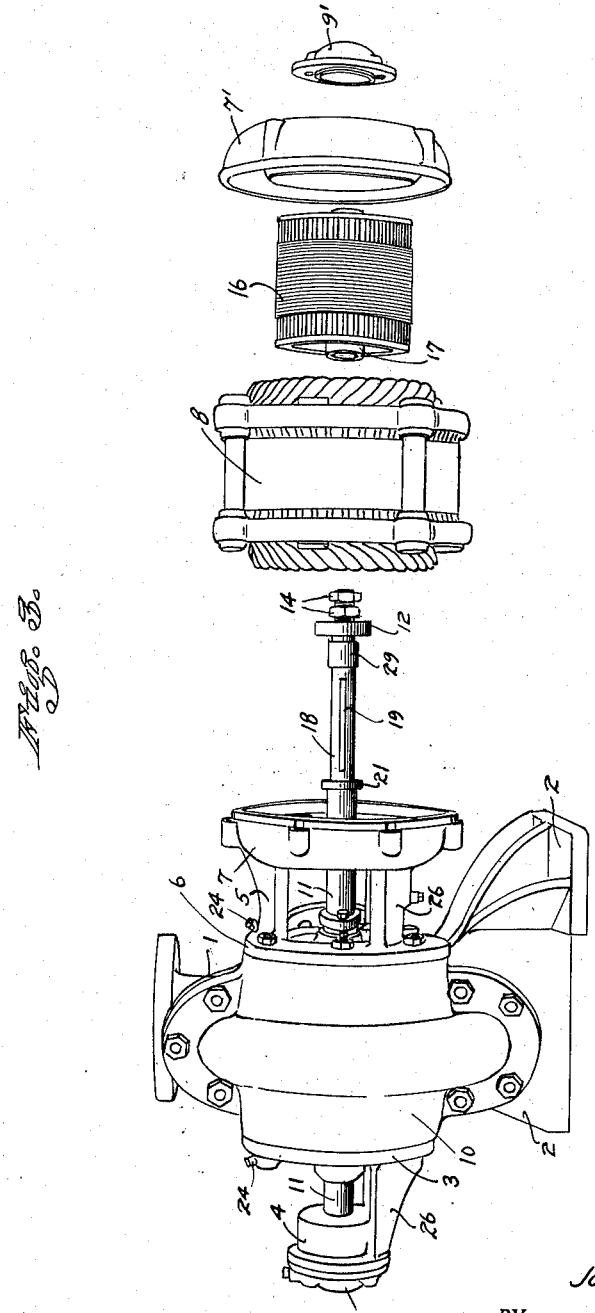

Patented Oct. 7, 1930

1,777,852

UNITED STATES PATENT OFFICE

JOSEPH L. LAWRENCE, OF SAN FRANCISCO, CALIFORNIA, ASSIGNOR TO CIRCLE PUMP COMPANY, A CORPORATION

MOTOR-DRIVEN PUMP

Application filed November 12, 1923. Serial No. 674,326.

The principal objects of my invention are an arrangement whereby the pump and motor form a unitary structure supported by a common base, the elimination of the flexible coupling usually placed between the motor and the pump; the use of a common shaft carrying both pump and motor rotors, means for quickly disassembling the motor from the shaft without affecting the pump, means for adjusting the electrical center of the rotor on the shaft relative to the pump rotor and for maintaining it in such adjusted position, adjustable means for preventing water from passing from the pump to the motor in close connections of this kind, together with other desirable constructional features which will be explained as the specification proceeds.

I attain the objects outlined above by the construction shown in the accompanying drawings, and wherein Figure 1 is an elevation in longitudinal section and shows most of the elements of my combined pump and motor installation, Figure 2 is an end view of Figure 1 from the line 2—2 thereof, and Figure 3 is a perspective view of the parts with the motor elements taken from the shaft to illustrate the method of their removal.

In the several figures (1) is a casting forming the major portion of a centrifugal pump housing formed integral with a base (2). At (3) is shown a flanged bracket bolted to the pump body and supporting a bearing housing (4) at its outer end.

On the opposite side of the pump is a double flanged bracket (5) having one flange (6) bolted to the pump and the other formed as the end housing member (7) of a motor (8). At the right of the motor is a similar end housing (7') of the motor, both being bolted thereto by means of cap screws as indicated, and at the extreme ends of both motor and pump are caps (9), (9') bolted to the adjacent members and forming oil chamber enclosures over the ends of the shaft.

The frame members just described are bolted one to the other as mentioned and form a very rigid assembly supported by a single base plate (2). The pump body is "split" to the center line and has a removable cap (10) omitted in Figure 1 but shown in Figures 2 and 3.

Annular gaskets (30) lie against the chamfered edges of the pump flanges to seal the joint of the parts.

Within the assemblage is a single central shaft (11) supported at the motor end in an annular ball bearing (12) and at the pump end in an annular and double thrust type ball bearing (13). These bearings are of standard construction and are fitted within the housings and have the inner ball races secured on the shaft against a shouldered end by means of nuts (14) threaded to the shaft in the customary way of securing such bearings to a shaft.

On the shaft is keyed the pump rotor (15) here shown as an enclosed runner and at the motor end of the shaft is secured the rotor (16) of the motor.

Instead of the rotor being secured directly to the shaft it is securely mounted upon a sleeve (17) which in turn is slipped over a reduced portion (18) of the shaft, and held from turning by a key or keys (19). Between the end of the sleeve and the shaft shoulder (20) is a spacing washer (21) which is of a thickness to accurately align the electrical centers of the motor stator and rotor. This is used in order to compensate for the machining of the parts, as the shaft being fixed longitudinally, the machining of the various parts makes it difficult to insure the centers of the housing assemblage being precisely the same as the rotor centers on the shaft.

The centrifugal pump has stuffing boxes at each side as indicated at (22) with spacing rings (23) fed by water pipes (24) to prevent admission of air in the usual manner and it should be observed that the bearing at the end of the pump is spacedly supported from the stuffing box gland (25) to permit easy adjustment of same and that drip or drainage pans (26) are formed in the casting under each stuffing box. Between the end bearing and also between the motor and the pump, are arranged felt rings (27) to prevent passage of water or lubricants and at (28) on the shaft is a water thrower.

To assemble, the shaft with the pump rotor secured to it is inserted in the pump, the pump cap (10) is placed in position, the end brackets (3) and (5) are bolted in place, the stator or rotor of the motor follow next, then the end housing (7'), after which follows a spacing sleeve or collar (29), the ball bearing (12) and the securing nuts (14), and finally the end caps (9)—(9').

It will be observed that the rotor of the motor is forced in place against the spacing washer (21) by the pressure of the nuts (14) transmitted through the inner bearing ring of the bearing (12) to the spacing sleeve (29), thence to the rotor sleeve (17), and that any of the motor elements may be slipped off of the shaft easily and quickly without disturbing the pump elements.

Figure 3 shows in perspective the whole assembly with the motor elements slipped off the shaft and arranged in axial alignment therewith to convey the idea of their assemblage or disassemblage independent of the pump elements.

Having thus described my invention and shown in the drawings one adaptation of it in a combined motor-pump installation, it will be apparent that my improved motor assembly need not be restricted to use with a centrifugal pump, or even to a motor per se, as the same arrangement may be applied to a dynamo, or motor-generator, turbine-generator, or similar installation, and any such adaptation coming within the spirit of my invention is intended to be embraced in the following claim.

I claim:

In combination, a pump base, a pump supported by said base, a cage carried by the pump casing, a pump shaft extending through the cage and projecting beyond it, a motor field winding removably secured to said cage and being entirely supported thereby, an armature removably mounted on the projecting portion of said shaft and being enclosed in said field winding, an end covering for the field, and a bearing for the projected end of said shaft and being removably supported by said end covering.

JOSEPH L. LAWRENCE.